(12) United States Patent
Pfleiderer

(10) Patent No.: US 12,390,316 B2
(45) Date of Patent: Aug. 19, 2025

(54) ENDODONTIC FILE CLIP FOR AN APEX LOCATOR

(71) Applicant: DENTSPLY SIRONA INC., York, PA (US)

(72) Inventor: Martin Pfleiderer, Auvernier (CH)

(73) Assignee: Dentsply Sirona Inc., York, PA (US)

( * ) Notice: Subject to any disclaimer, the term of this patent is extended or adjusted under 35 U.S.C. 154(b) by 462 days.

(21) Appl. No.: 17/610,231

(22) PCT Filed: May 14, 2020

(86) PCT No.: PCT/EP2020/063443
§ 371 (c)(1),
(2) Date: Nov. 10, 2021

(87) PCT Pub. No.: WO2020/229591
PCT Pub. Date: Nov. 19, 2020

(65) Prior Publication Data
US 2022/0249216 A1 Aug. 11, 2022

(30) Foreign Application Priority Data
May 14, 2019 (EP) .................................... 19174433

(51) Int. Cl.
*A61C 19/04* (2006.01)
(52) U.S. Cl.
CPC .......... *A61C 19/041* (2013.01); *A61C 19/042* (2013.01)
(58) Field of Classification Search
CPC ....... A61C 19/041; A61C 19/042; A61C 5/42; A61C 5/44; A61C 5/40; A61B 18/1485; A61B 2018/1422
See application file for complete search history.

(56) References Cited

U.S. PATENT DOCUMENTS 1,945,327 A * 1/1934 Morse ................ A61B 18/1485
362/120
4,943,290 A * 7/1990 Rexroth ............. A61B 18/1485
606/49
(Continued)

FOREIGN PATENT DOCUMENTS

CA 3120798 A1 11/2020
CN 101828976 A 9/2010
(Continued)

OTHER PUBLICATIONS

International Search Report; PCT/EP2020/063443; Jul. 16, 2020 (completed); Jul. 27, 2020 (mailed).
(Continued)

*Primary Examiner* — Heidi M Eide
*Assistant Examiner* — Holly T. To
(74) *Attorney, Agent, or Firm* — SCHWEGMAN LUNDBERG & WOESSNER, P.A.

(57) ABSTRACT

The present invention relates to an endodontic file clip (1) for an apex locator, comprising: a hollow body (2); a push button (3) movably linked to the body (2); a spring (4) pushing the push button (3) away from the body (2); an electrically conductive hook (5) movably arranged within the body (2) and partly protruding out of the tip (2a) of the body (2) and fixed to the push button (3) to securely attach an endodontic file (6) to the tip (2a) when the push button (3) is released towards the closed position, and disengage from the endodontic file (6) when the push button (3) is pressed towards the open position; characterized by further comprising: a detachment mechanism (7) for re-attachably detaching the push button (3), the spring (4) and the hook (5) from the body (2) for cleaning and disinfection in a dental washer disinfector, wherein the detachment mechanism (7) comprises a detachment slot (2c; 2c') in the body (2) which extends up to the tip (2a) and joins said hole, to allow (Continued)

manual detachment of the push button (3), the spring (4) and the hook (5) from the body (2) when the hook (5) is manually moved from said hole into the detachment slot (2*c*, 2*c'*).

17 Claims, 15 Drawing Sheets

(56) References Cited

U.S. PATENT DOCUMENTS

| | | | | |
|---|---|---|---|---|
| 5,843,020 | A * | 12/1998 | Tu | A61B 18/1485 |
| | | | | 604/500 |
| D940,876 | S * | 1/2022 | Pfleiderer | D24/176 |
| 2006/0154199 | A1* | 7/2006 | Maxwell | A61C 19/041 |
| | | | | 433/224 |
| 2009/0053666 | A1* | 2/2009 | Buchanan | A61C 19/041 |
| | | | | 433/27 |
| 2016/0143705 | A1* | 5/2016 | Clark | A61C 5/40 |
| | | | | 433/102 |
| 2019/0053884 | A1* | 2/2019 | Langbein | A61C 5/44 |
| 2020/0179043 | A1* | 6/2020 | Townley | A61B 34/10 |

FOREIGN PATENT DOCUMENTS

| | | |
|---|---|---|
| EP | 3738546 | 11/2020 |
| JP | 2004000554 A | 1/2004 |
| JP | 2012019849 A | 2/2012 |
| WO | 2020229591 | 11/2020 |

OTHER PUBLICATIONS

International Preliminary Report on Patentability; PCT/EP/2020/063443; Jul. 16, 2020 (completed); Jul. 27, 2020 (mailed).

Written Opinion of the International Searching Authorityl; PCT/EP/2020/063443; Jul. 16, 2020 (completed); Jul. 27, 2020 (mailed).

"European Application Serial No. 19174433.3, Extended European Search Report mailed Oct. 21, 2019", 7 pgs.

"European Application Serial No. 19174433.3, Response filed Apr. 27, 2021 to Extended European Search Report mailed Oct. 21, 2019", 30 pgs.

"Canadian Application Serial No. 3,120,798, Office Action mailed May 27, 2025", 3 pgs.

* cited by examiner

ENDODONTIC FILE CLIP FOR AN APEX LOCATOR

TECHNICAL FIELD OF THE INVENTION

The present invention relates to an endodontic file clip for attachment to an endodontic file and for use with an apex locator to determine the length of the dental root canal to be treated.

BACKGROUND ART OF THE INVENTION

Root canal treatment also known as endodontic treatment, involves the removal of the infected dental pulp such as nerves, blood vessels and other cellular tissues from the tooth. Endodontic files are used to remove the infected pulp particularly from the root canal of the tooth. The root canals generally vary in length. Therefore, the position of the endodontic file relative to the tooth apex must be precisely determined. The tooth has an electrical impedance which can be measured with an electronical measurement device commonly known as an apex locator. The use of the apex locator during the endodontic treatment requires a closed electrical circuit which can be established through a couple of electrodes including a first electrode known as the lip clip which is attachable to the lip and a second electrode known as the endodontic file clip which is attachable to the endodontic file. The electrical impedance between the lip clip and the endodontic file changes with the increase of the endodontic file engagement inside the root canal located between the root canal entry and the apical constriction. The endodontic file clip is generally provided as a separate device which can be connected to the apex locator through a cable.

JP2012019849A, CN101828976A, and JP2004000554A, each discloses an endodontic file clip having a spring-loaded push button that is movably mounted to a tube-like body, and non-releasably fixed to a hook-like electrode penetrating through the tube-like body to clamp the endodontic file.

Endodontic file clips are contaminated during patient treatment with pulp tissue and saliva. For meeting the hygienic requirements, the endodontic file clip must be disinfected before re-use. However, the prior art endodontic file clips are generally made up of several components with close interfaces and narrow gaps. These make a time-consuming manual cleaning unavoidable.

DISCLOSURE OF THE INVENTION

An objective of the present invention is to overcome the disadvantages of the prior art and provide an endodontic file clip which is easy to use in endodontic treatment and which can be disassembled after use for cleaning and disinfection in a dental washer disinfector, be sterilized and reassembled for re-use.

These objectives are achieved through the endodontic file clip as defined in claim 1. The subject-matters of the dependent claims relate to further developments.

The endodontic file clip of the present invention is suitable for use with an apex locator. The endodontic file clip comprises a hollow body; a push button movably linked to the body; a spring pushing the push button away from the body; an electrically conductive hook movably arranged within the body and partly protruding out of the tip of the body and fixed to the push button to securely attach an endodontic file to the tip when the push button is released towards the closed position, and disengage from the endodontic file when the push button is pressed towards the open position. The endodontic file clip further comprises: a detachment mechanism for re-attachably detaching the push button, the spring and the hook from the body for cleaning and disinfection in a dental washer disinfector, wherein the detachment mechanism comprises a detachment slot in the body which extends up to the tip, and joins said hole, to allow manual detachment of the push button, the spring and the hook from the body when the hook is manually moved from said hole into the detachment slot.

A major advantageous effect of the present invention is that the endodontic file clip can be disassembled for cleaning and disinfection. Once disassembled, each of the components can be easily and quickly cleaned and disinfected. The cleaning and disinfection can be made manually or automatically in a dental washer disinfector. Since all surfaces of the disassembled endodontic file are fully visible, the removal of the pulp tissue and saliva can be visually verified after the cleaning and the disinfection has been completed.

According to the present invention the endodontic file clip may be optionally provided with at least one security mechanism (hereinafter the first security mechanism) for preventing unintentional or accidental disassembly of the components, namely of the push button, the spring, the hook, and the body during endodontic treatment when the push button is in the closed position. The first security mechanism blocks the detachment mechanism when the push button is in the closed position and unblocks the detachment mechanism when the push button is in the open position. To use the detachment mechanism the optional first security mechanism must be unlocked. In an embodiment of the first security mechanism the hook is provided with a u-shaped portion that becomes attached to a notch in the body near the tip when the push button is moved to the closed position. In the closed position, the endodontic file is securely attached by the u-shaped portion of the hook to the tip. When the push button is moved to the open position, the u-shaped portion of the hook becomes detached from the notch i.e., the first security mechanism becomes unlocked, then the endodontic file can also be freely detached from the hook, and, if desired, the endodontic file clip can be further disassembled through the detachment mechanism unless not blocked through a further optional security mechanism (hereinafter the second optional security mechanism) which will be introduced as next. Thereby, a more secure operation of the endodontic file clip can be achieved during or after the endodontic treatment.

According to the present invention the endodontic file clip may be optionally provided with a further security mechanism i.e., the second security mechanism for preventing unintentional or accidental disassembly of the components during endodontic treatment when the push button is in the open position for engaging/disengaging the endodontic file. To use the detachment mechanism the optional second security mechanism must be unlocked. In an embodiment of the second security mechanism, the push button has two depression levels. When the push button is at the first depression level corresponding to the open position, the endodontic file can be engaged with or disengaged from the hook, but the second security mechanism blocks the detachment mechanism, and when the push button is further pressed to the second depression level beyond the open position, the second security mechanism becomes unlocked, and the second security mechanism unblocks the detachment mechanism.

According to the present invention, in an embodiment of the detachment mechanism, the body is provided with a detachment slot near the tip to allow manual detachment of the push button, the spring and the hook from the body (hereinafter detachment operation). To initiate the detachment operation, the optional first security mechanism and the optional second security mechanism must be each unlocked, then the hook must be manually moved into the detachment slot. Thereafter, the push button can be relatively slid out of the body together with the spring and the hook fixed thereto. When the push button is at the first depression level corresponding to the open position, the endodontic file can be disengaged from the hook, but the optional second security mechanism blocks manual movement of the hook into the detachment slot, and when the push button is further pressed to the second depression level then the second security mechanism unblocks manual movement of the hook and the hook can be freely moved into the detachment slot. The detachment slot may be formed into various portions of the body. In a version of this embodiment, the detachment slot is at the back portion of the body. And the hook can be moved into the detachment slot by tilting/flexing the same. In an alternative version of this embodiment, the detachment slot is at the lateral portion of the body. And the hook can be moved into the slot by rotating the same, preferably through 90 degrees. For facilitating the rotation of the hook during the detachment operation, the front face of the push button is optionally provided with a screw driver slot or a protruding grip. In a further version of this embodiment, the detachment slot is optionally further provided with a window portion whereas the hook is further provided with a key portion which is wider than the detachment slot and which matches the window portion. The key portion can pass through the window portion during the detachment operation. The interior of the hollow body is optionally provided with a ramp-like guiding portion for guiding the key portion through the window portion during reassembly. When the push button is pressed to the first depression level, the hook can be disengaged from the endodontic file, but the key portion stays short of clearance from the tip, and thus the hook cannot be moved i.e., tilted into the detachment slot unless the push button is further pressed to the second depression level. When the push button is further pressed to the second depression level, the hook can be freely tilted through the detachment slot i.e., the second security mechanism becomes unlocked and thus the push button, the spring and the hook can be detached from the body. Thereby, a more secure operation of the endodontic file clip can be achieved during or after the endodontic treatment. In a further alternative version of this embodiment, the push button is further optionally provided with bayonet type u-shaped cam groove whereas the body is further provided with a cam pin matching the u-shaped cam groove. Alternatively, the respective positions of cam pin and the cam groove may be interchanged. The depth of the cam groove may be pre-adjusted to have a single or a two-level depression push button. In the latter case, when the push button is pressed to the first depression level, the hook can be disengaged from the endodontic file, but the cam pin stays short of clearance from the vertical portion of the cam groove, and thus the hook cannot be moved i.e., rotated into the detachment slot unless the push button is further pressed to the second depression level. When the push button is further pressed to the second depression level, the cam pin can be rotated in the horizontal portion of the cam groove i.e., the second security mechanism becomes unlocked and the hook can be freely rotated to get aligned with the detachment slot, and thus the push button, the spring and the hook can be detached through the only open end of the cam groove from the body. Thereby, a more secure operation of the endodontic file clip can be achieved during or after the endodontic treatment.

According to the present invention the endodontic file clip is optionally provided with a further security mechanism (hereinafter the third security mechanism) for preventing unintentional or accidental disassembly of the components when the push button is in the open position. Therefore, in an embodiment of the third security mechanism, the two-level push button has no collar, namely it is provided without a collar. When the push button is pressed to the first depression level then it becomes flush with the lower part of body. When the push button is further pressed to the second level then the push button is deep inside the body. However, since the depression region inside the body is small compared to the finger, the user must preferably utilize a paper clip, a pencil, or the like to press the push button deep into the body until the second depression level is reached. Thereby, a more secure operation of the endodontic file clip can be achieved during or after the endodontic treatment.

BRIEF DESCRIPTION OF THE DRAWINGS

In the subsequent description, the present invention will be described in more detail by using exemplary embodiments and by referring to the drawings, wherein FIG. 1—is a schematic lateral side view of an endodontic file clip in the open position according to a first embodiment of the present invention.

Figure 1:
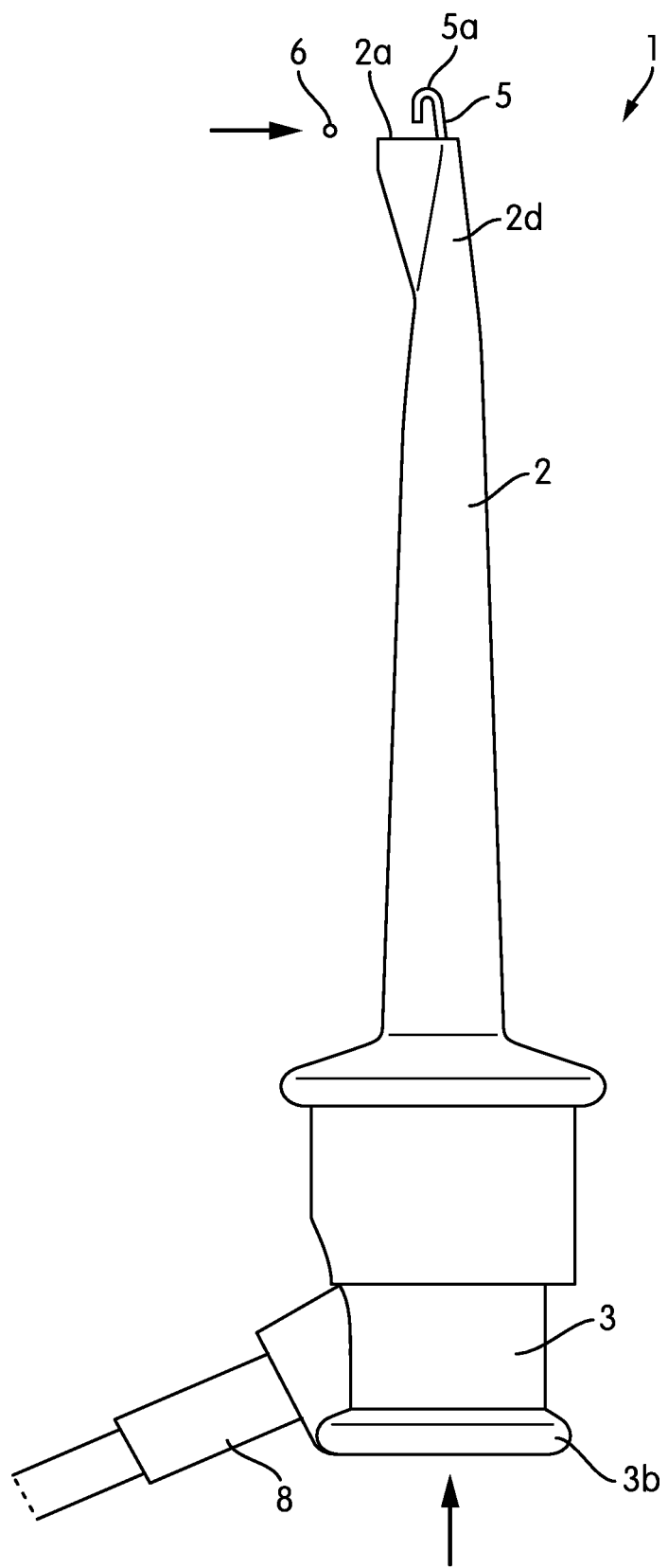

The reference numbers shown in the drawings denote the elements as listed below and will be referred to in the subsequent description of the exemplary embodiments.

Figure 2A:
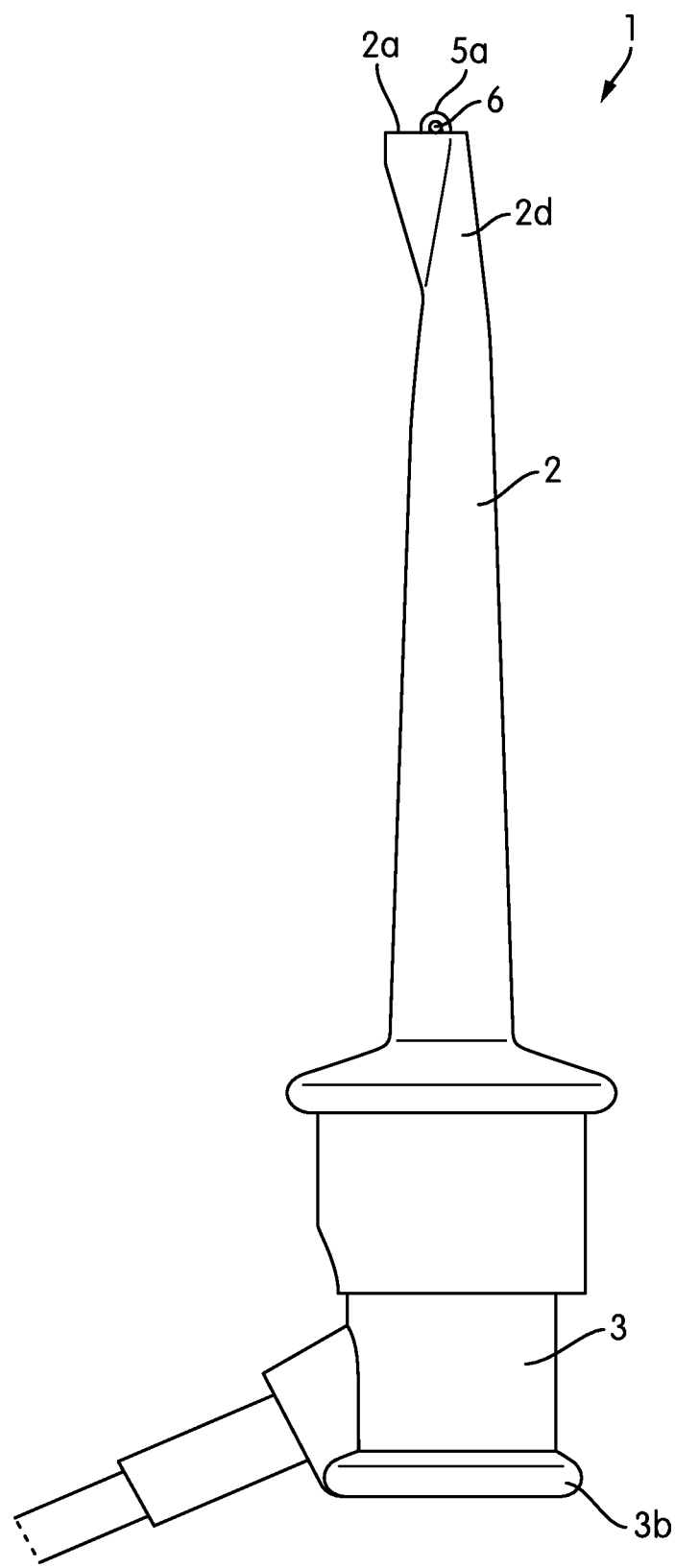
FIG. 2A—is a schematic lateral side view of the endodontic file clip of FIG. 1 in the closed position.
Figure 2B:
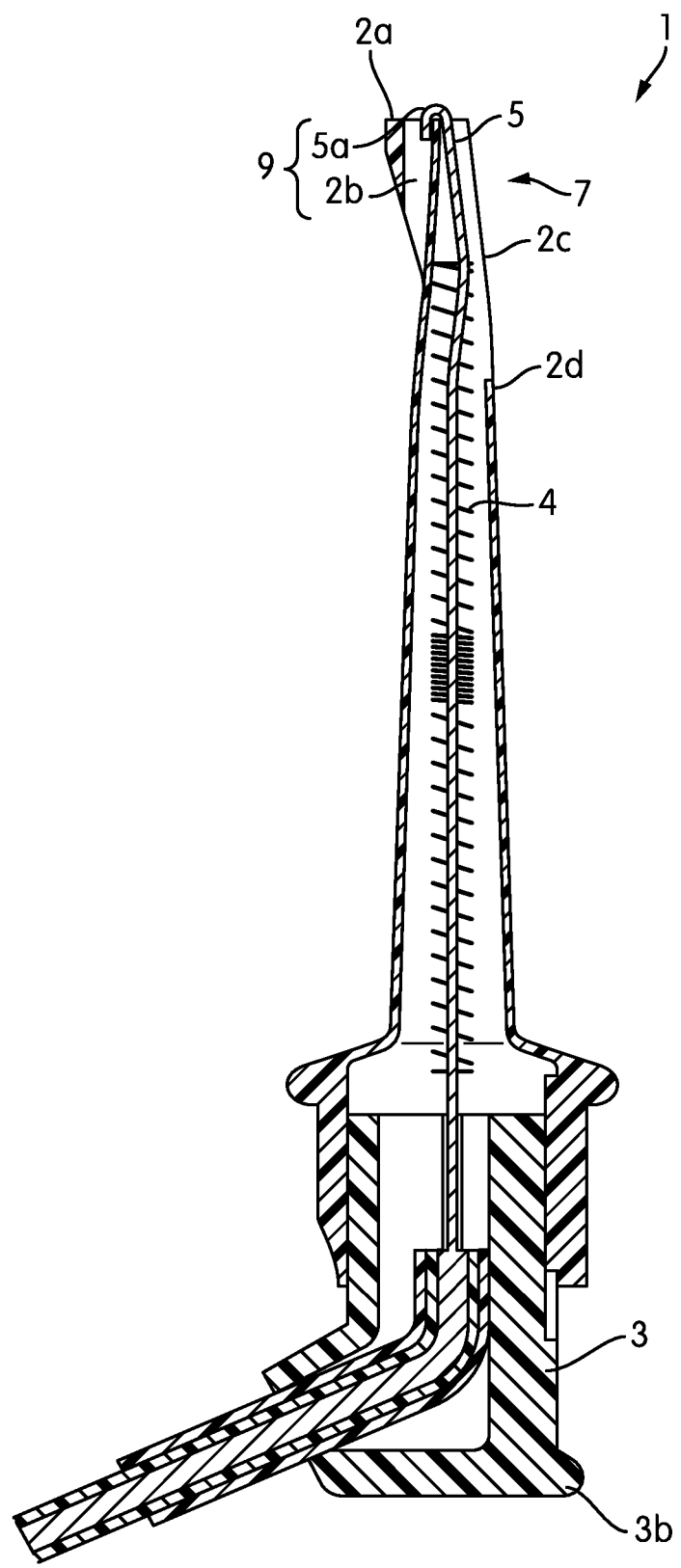
FIG. 2B—is a schematic vertical cross-sectional view of the endodontic file clip of FIG. 2A.
Figure 3:
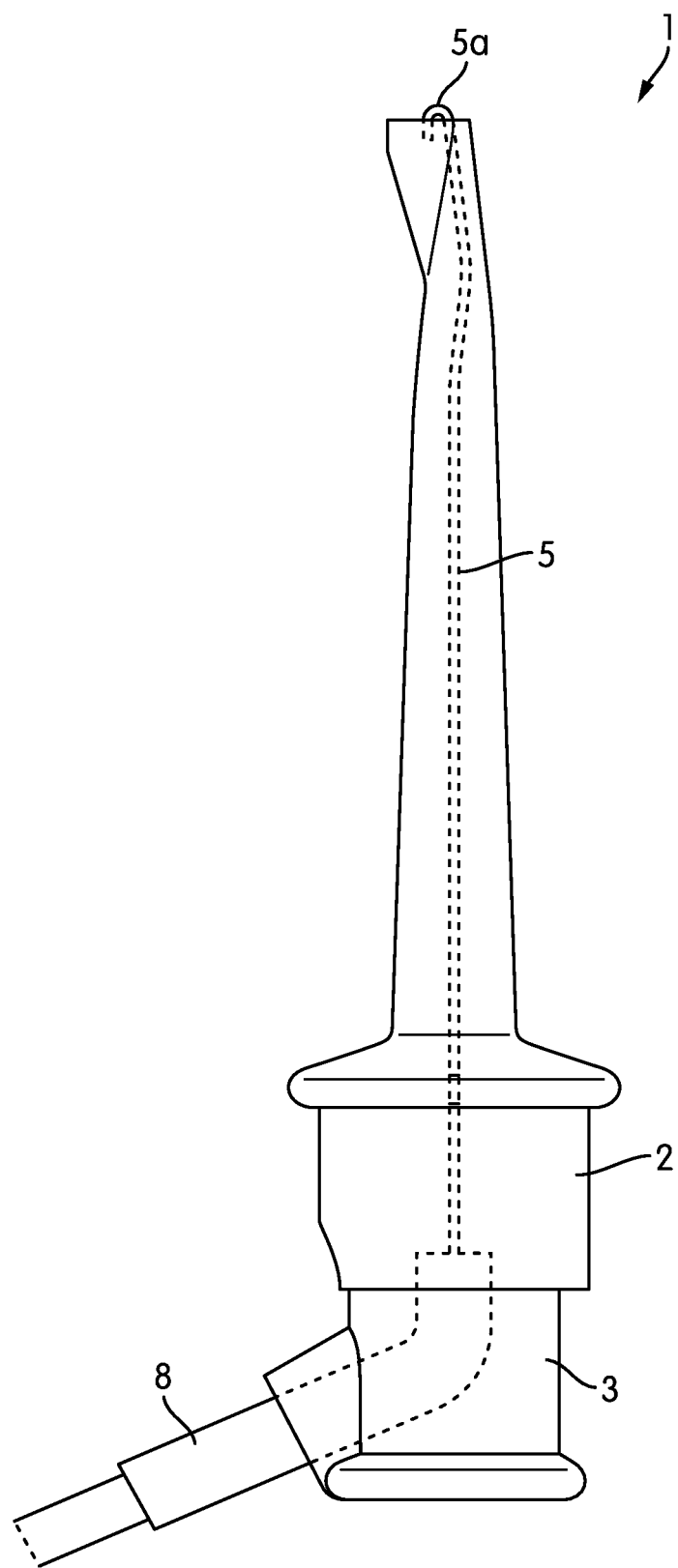
FIG. 3—is a schematic lateral side view of the endodontic file clip of FIG. 1, wherein the dotted lines show the hook and the cable.
Figure 4:
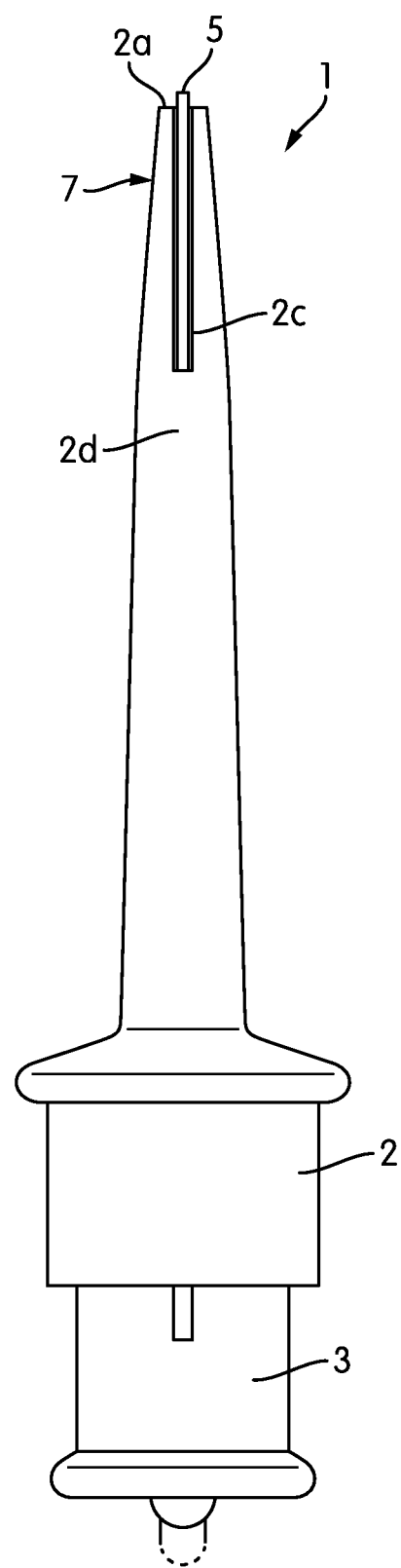
FIG. 4—is a schematic rear side view of the endodontic file clip of FIG. 1, wherein a detachment slot is formed in the back portion of the body.
Figure 5A:
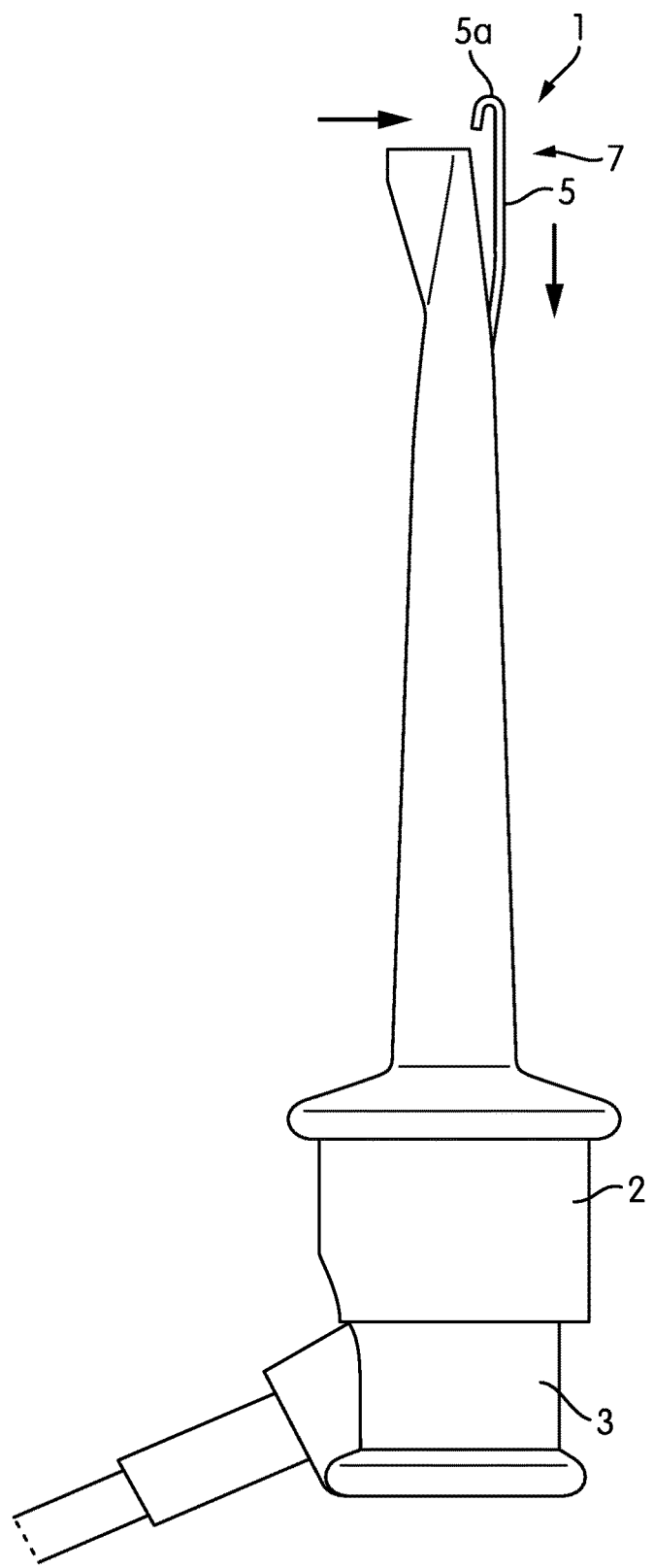
FIG. 5A—is a schematic lateral side view of the endodontic file clip of FIG. 1, wherein the push button, the book, the spring and the cable are being detached from the body.
Figure 5B:
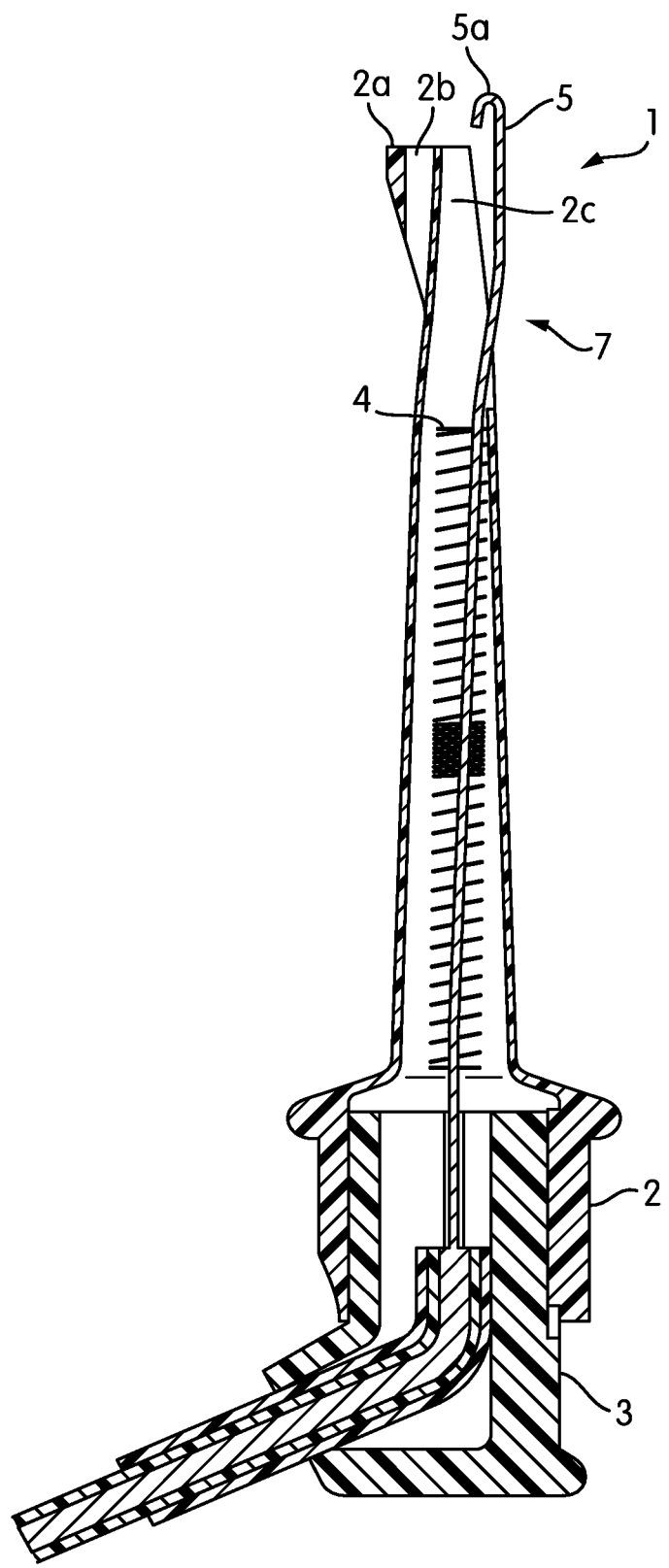
FIG. 5B—is a schematic cross-sectional view of the endodontic file clip of FIG. 5A.
Figure 6:
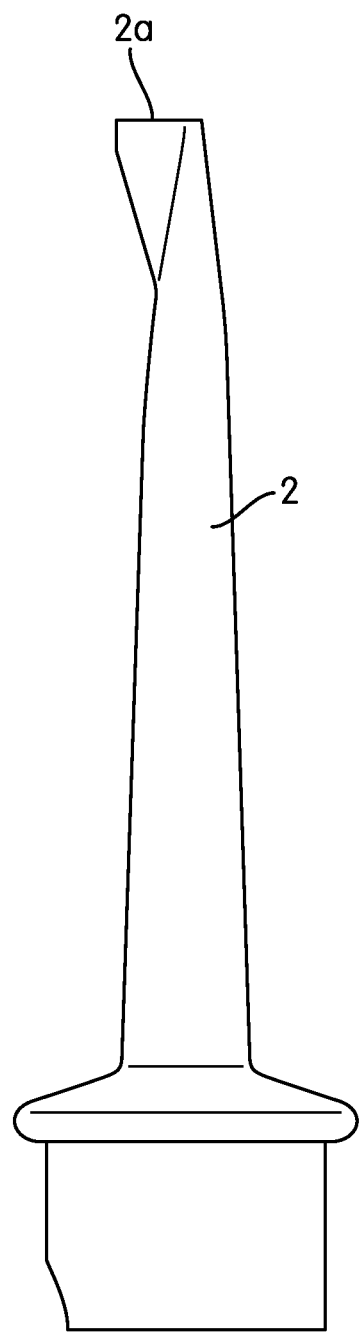
FIG. 6—is a schematic lateral side view of the body of the endodontic file clip of FIG. 1.
Figure 7:
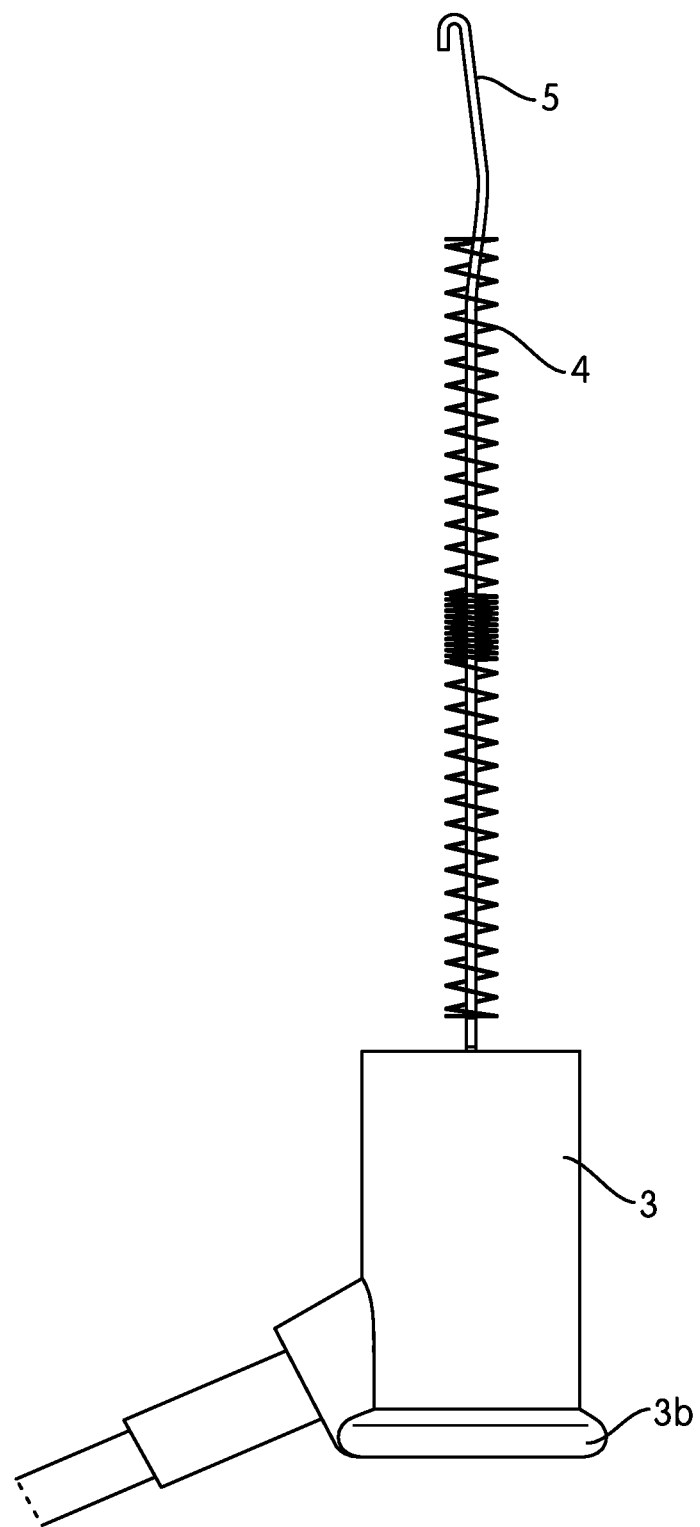
FIG. 7—is a schematic lateral side view of the push button, the hook, the spring and the cable of the endodontic file clip of FIG. 1.

1. Endodontic file clip
2. Body
2*a*. Tip
2*b*. Notch
2*c*. Detachment slot
2*c'*. Detachment slot
2*d*. Back portion
2*e*. Lateral portion
2*f*. Cam pin
2*g*. Window portion
2*h*. Ramp
3. Push button
3*a*. Cam groove
3*b*. Collar
3*c*. Screw driver slot
4. Spring
5. Hook
5*a*. U-shaped portion
5*b*. Key portion
6. Endodontic file
7. Detachment mechanism
8. Cable
9, 10, 10', 11. Security mechanisms FIG. 1 shows a schematic lateral side view of an endodontic file clip (1) in the open position according to a first embodiment. The endodontic file clip (1) is suitable for use with an apex locator. In the first embodiment, as shown in detail in FIG. 2B, the endodontic file clip (1) comprises: a hollow body (2); a push button (3) movably linked to the body (2); a spring (4) pushing the push button (3) away from the body (2); an electrically conductive hook (5) movably arranged within the body (2) and partly protruding out of a hole in the tip (2*a*) of the body (2) and fixed to the push button (3) to securely attach an endodontic file (6) to the tip (2*a*) when the push button (3) is released towards the closed position (FIG. 2A), and disengage from the endodontic file (6) when the push button (3) is pressed towards the open position (FIG. 1). As shown in FIG. 3, the hook (5) is connected to the cable (8). As shown in FIG. 5A and FIG. 5B, the endodontic file clip (1) further comprises: a detachment mechanism (7) for re-attachably detaching the push button (3), the spring (4) and the hook (5) from the body (2) for cleaning and disinfection in a dental washer disinfector. As shown in FIG. 5B, the detachment mechanism (7) comprises a detachment slot (2*c*) in the body (2) which extends up to the tip (2*a*) and joins said hole, to allow manual detachment of the push button (3), the spring (4) and the hook (5) from the body (2) when the hook (5) is manually moved into the detachment slot (2*c*). Thereafter the push button (3) can be slid out of the body (2) together with the spring (4) and the hook (5) fixed thereto. As shown in FIG. 4, the detachment slot (2*c*) is at the back portion (2*d*) of the body (2), averted from the u-shaped portion (5*a*) of the hook (5). And the hook (5) is tiltable (FIG. 5A) for alignment with the detachment slot (2*c*). FIG. 6 shows the body (2) after being detached from the push button (3), the spring (4) and the hook (5) for cleaning and disinfection. FIG. 7 shows the hook (5), the spring (4), the push button (3) and the cable (8) of the endodontic file clip (1) after being detached from the body (2) for cleaning and disinfection. As shown in FIG. 2A and FIG. 5A, the endodontic file clip (1) has a security mechanism (9) which blocks the detachment mechanism (7) when the push button (3) is in the closed position (FIG. 2A) and unblocks the detachment mechanism (7) when the push button (3) is in the open position (FIG. 5B). As shown in more detail in FIG. 2B, the security mechanism (9) is configured through a notch (2*b*) which is formed into the body (2) near the tip (2*a*), and a u-shaped portion (5*a*) which is formed at the protruding end of the hook (5). The u-shaped portion (5*a*) becomes attached to the notch (2*b*) when the push button (3) is in the closed position and becomes detached from the notch (2*b*) when the push button (3) is in the open position.

Figure 8:
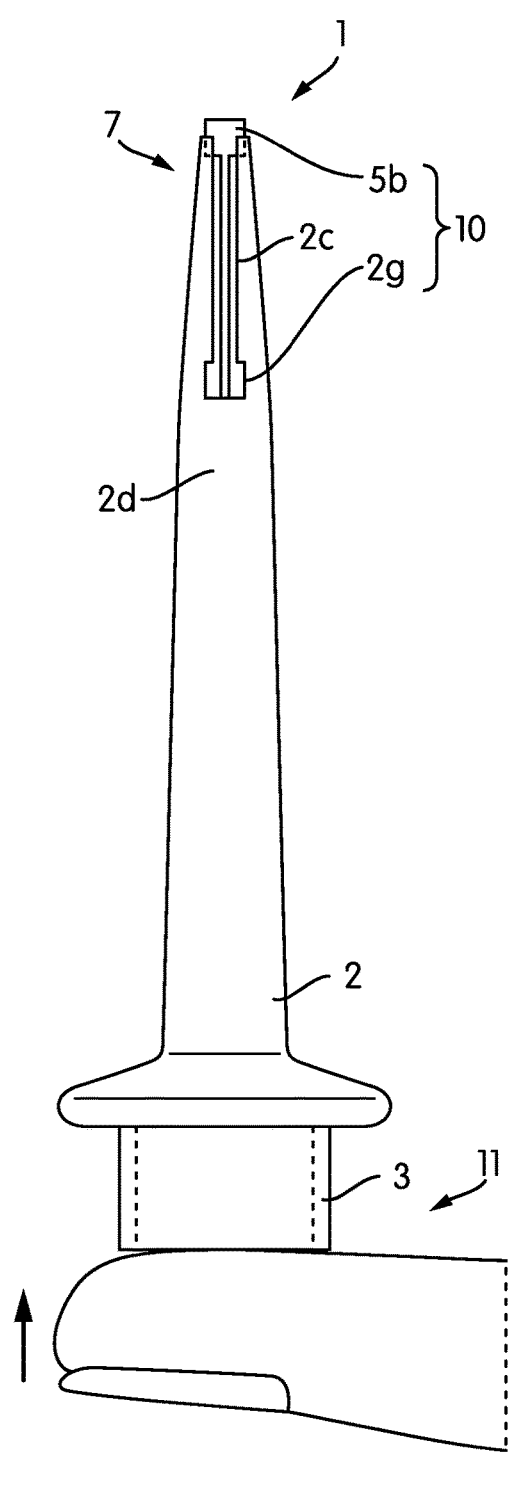
FIG. 8—is a schematic rear side view of an endodontic file clip according to a second embodiment of the present invention having a two-level push button, wherein the push button is pressed to the first depression level.
Figure 9A:
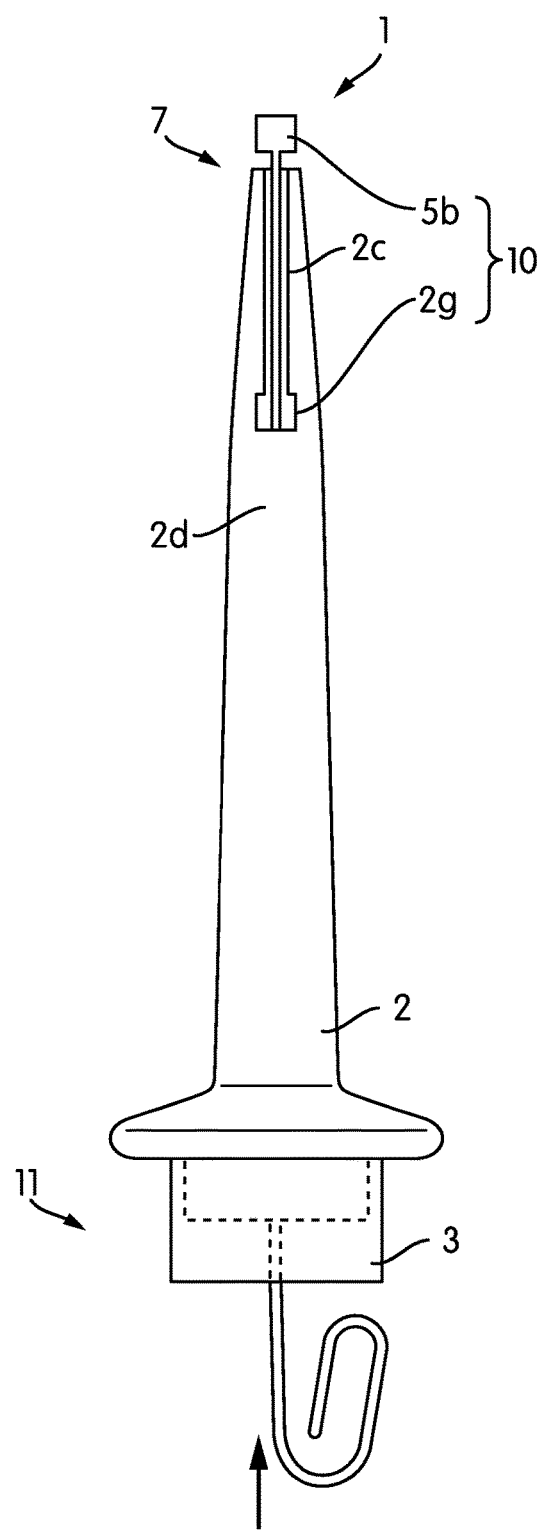
FIG. 9A—is another schematic rear side view of the endodontic file clip of FIG. 8, wherein the push button is pressed to the second depression level.
Figure 9B:
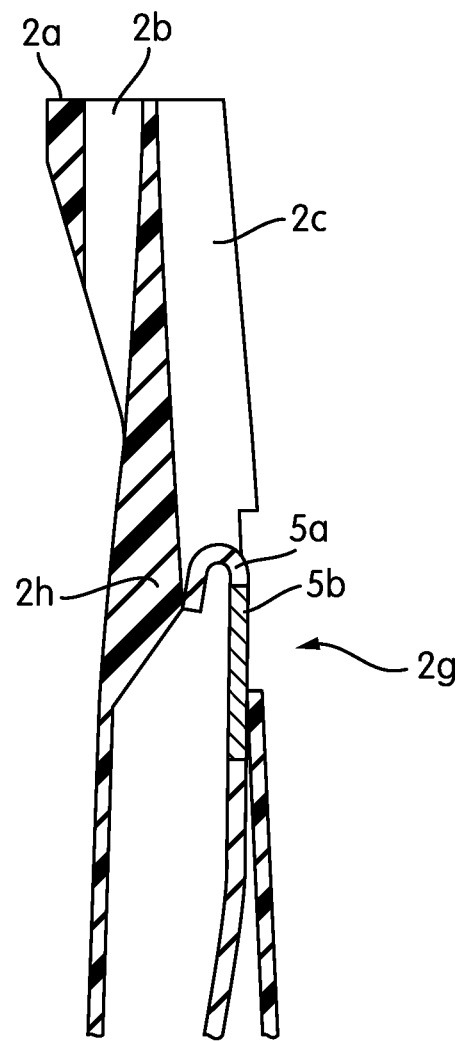
FIG. 9B—is a cross sectional schematic partial side view of the endodontic file of FIG. 9A during reassembly.

FIG. 8 shows a rear side view of an endodontic file clip according to a second embodiment. In the second embodiment, the endodontic file clip (1) has a security mechanism (10) which is configured through a window portion (2*g*) that is formed into the detachment slot (2*c*) and a key portion (5*b*) that is formed onto the hook (5). The key portion (5*b*) is wider than the detachment slot (2*c*) and matches the window portion (2*g*) for passage. In the second embodiment, the push button (3) has two depression levels such that when the push button (3) is at the first depression level (FIG. 8) corresponding to the open position, the endodontic file (6) can be disengaged from the hook (5), but the key portion (5*b*) stays short of clearance from detachment slot (2*c*) at the tip (2*a*), and thus the security mechanism (10) blocks the detachment mechanism (7), particularly the security mechanism (10) blocks manual tilting movement of the hook (5) into the detachment slot (2*c*). As shown in FIG. 9A, when the push button (3) is further pressed to the second depression level beyond the open position, the security mechanism (10) unblocks the detachment mechanism (7), particularly the security mechanism (10) unblocks the manual tilting movement of the hook (5), and the hook (5) can be freely tilted/flexed through the detachment slot (2*c*). During the detachment operation the key portion (5*b*) is passed through the window portion (2*g*) as the push button (3) is slid out of the body (2) together with the spring (4) and the hook (5) fixed thereto. In the second embodiment, the endodontic file clip (1) has also a security mechanism (11) which is configured by the push button (3) which has the two depression levels but no collar (3*b*). As shown in FIG. 8, when push button (3) is at the first depression level then it becomes flush with the lower part of the body (2). And as shown in FIG. 9A, the user can further press the collarless push button (3) by using an attachment clip or a pencil. When the push button (3) is further pressed to the second depression level then the push button (3) is deep inside the body (2), and the security mechanism (10) is unlocked for allowing the manual detachment through detachment mechanism (7). FIG. 9B shows the interior of the hollow body (2). As shown in FIG. 9B the hollow body (2) is optionally provided with a ramp (2*h*) for guiding the key portion (Sb) through the window portion (2*g*) during reassembly.

Figure 10:
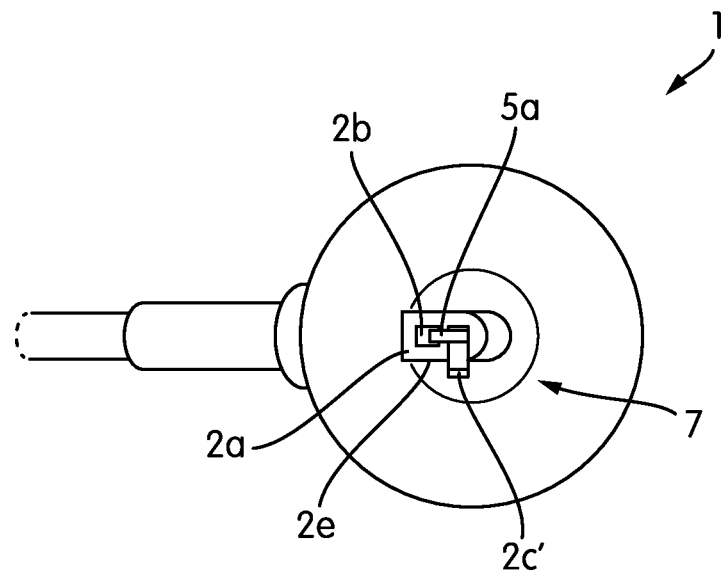
FIG. 10—is a schematic top view of an endodontic file clip in the closed position according to a third embodiment of the present invention.
Figure 11:
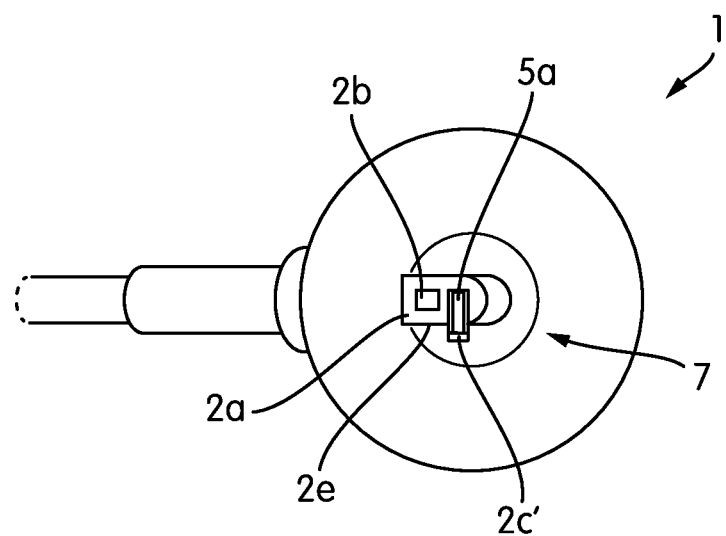
FIG. 11—is a schematic top view of the endodontic file clip of FIG. 10, wherein the hook has been counter clockwise rotated about 90 degrees to the detachment slot.
Figure 12:
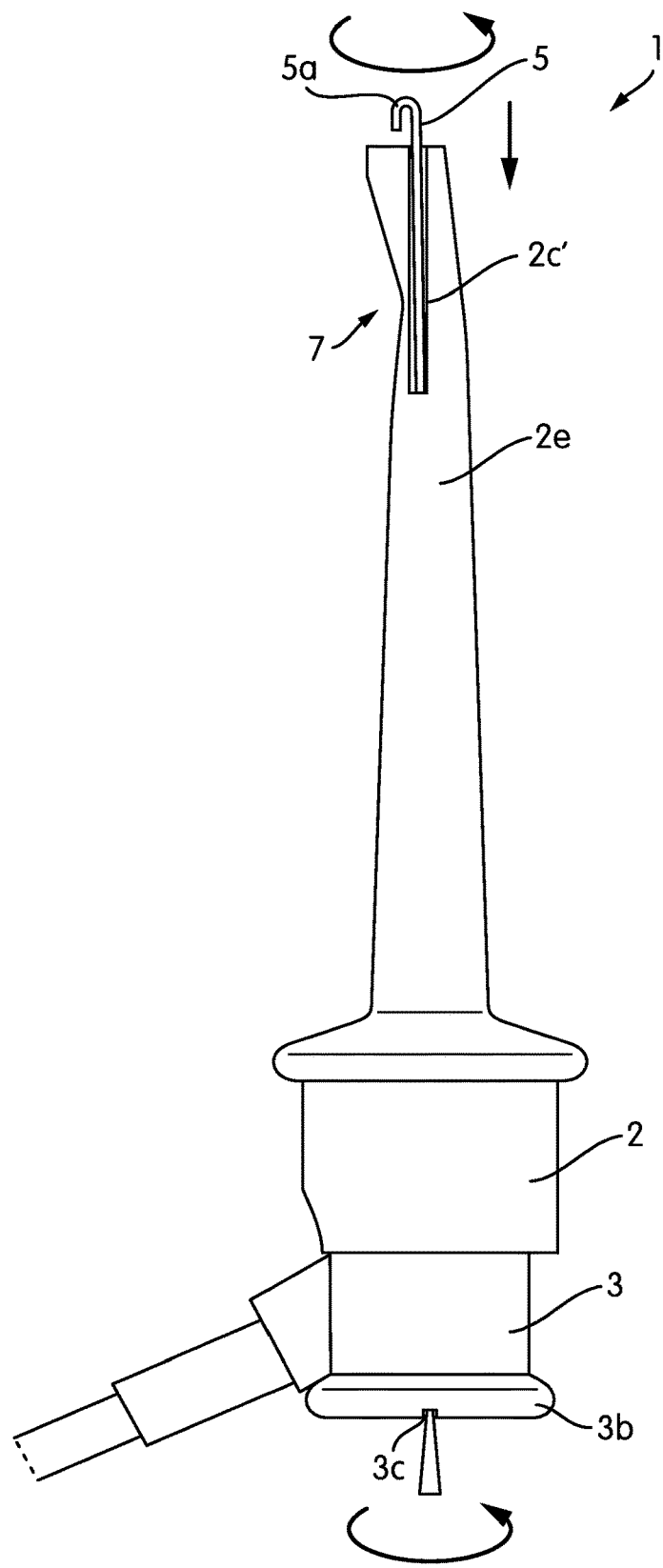
FIG. 12—is a schematic lateral side view of the endodontic file clip of FIG. 10, before the hook is completely 90 degrees counter clockwise rotated to the detachment slot.
Figure 13:
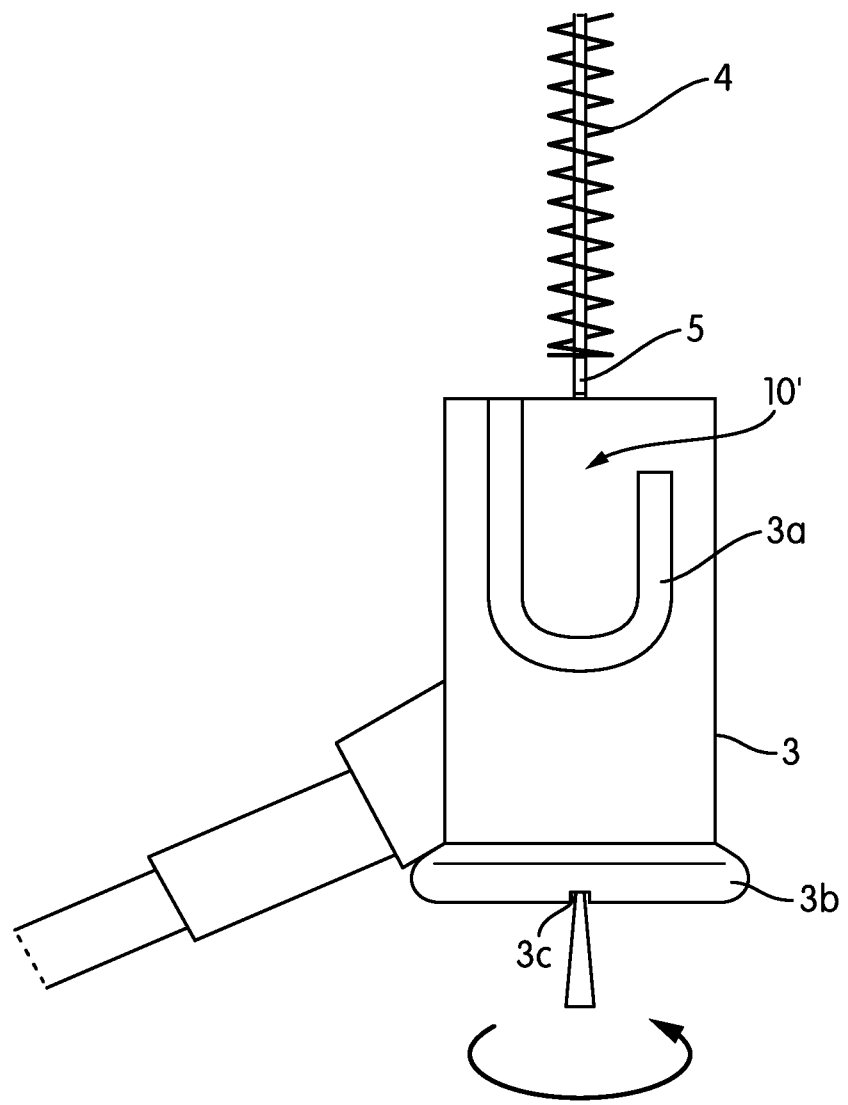
FIG. 13—is a schematic partial lateral side view of the push button, the hook, the spring, and the cable according to the third embodiment.
Figure 14:
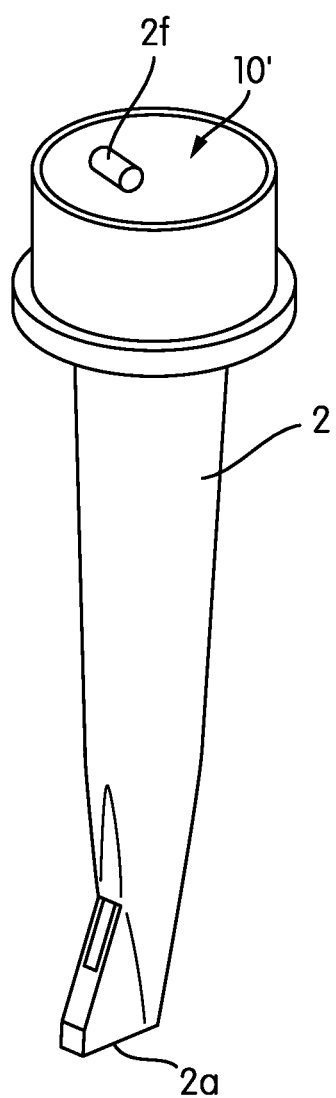
FIG. 14—is another schematic perspective view of the body of the endodontic file clip according to the third embodiment.

FIG. 10 shows a schematic top view of an endodontic file clip (1) in the closed position according to a third embodiment. In the third embodiment, as shown in FIG. 12, the detachment slot (2*c'*) is at the lateral portion (2*e*) of the body (2). The detachment slot (2*c'*) extends to the tip (2*a*) and joins the hole as explained before. And the hook (5) is rotatable for alignment with the detachment slot (2*c'*). The front face of the push button (3) comprises a slot (3*c*) for a screwdriver to facilitate rotation of the push button (3) during attachment or detachment. As shown in FIG. 13, the push button (3) has a cam groove (3a). As shown in FIG. 14, the body (2) has a cam pin (2f) for engaging with the cam groove (3a) respectively. As shown in FIG. 12, the push button (3a) can be pressed, rotated by a predetermined angle, preferably 90 degrees and released for alignment with the detachment slot (2c'). The endodontic file (6) can be disengaged from the hook (5) when the push button (3) is pressed to the open position. In third embodiment, endodontic file clip (1) has an alternative security mechanism (10'). And the depth of the cam groove (3a) has been increased also to have a two-depression level push button (3). As shown in FIG. 13 and FIG. 14, the alternative security system (10') is configured through the cam groove (3a) formed in the push button (2), and the cam pin (2f) formed into the body (2). When the push button (3) is at the first depression level then the endodontic file (6) can be disengaged from the hook (5), but the cam pin (2f) stays short of clearance from the vertical portion of the cam groove (3a) and cannot be rotated unless pressed further to the second depression level. When the push button (3) is further pressed to the second depression level then the hook (5) can be freely rotated along the horizontal portion of the cam groove (3a) to get aligned with the detachment slot (2c') as shown in FIG. 11. Thereafter the push button (3) can be slid out of the body (2) together with the spring (4) and the hook (5) fixed thereto.

The invention claimed is:

1. An endodontic file clip for an apex locator, comprising:
a hollow body;
a push button movably linked to the body;
a spring pushing the push button away from the body;
an electrically conductive hook movably arranged within the body and partly protruding out of a hole on a tip of the body and fixed to the push button to securely attach an endodontic file to the tip when the push button is released towards a closed position, and disengage from the endodontic file when the push button is pressed towards an open position;
characterized by further comprising:
a detachment mechanism for re-attachably detaching the push button, the spring and the hook from the body, wherein the detachment mechanism comprises a detachment slot in the body which extends up to the tip and joins said hole, to allow manual detachment of the push button, the spring and the hook from the body when the hook is manually moved from said hole into the detachment slot, and further wherein the hook is tiltable for alignment with the detachment slot
wherein
the detachment slot is at a back portion of the body, averted from a u-shaped portion of the hook and the hook is manually tiltable for alignment with the detachment slot; or
the detachment slot is at a lateral portion of the body and the hook is manually rotatable for alignment with the detachment slot.

2. The endodontic file clip according to claim 1, characterized by further comprising a security mechanism, wherein the push button has two depression levels, and when the push button is at the first depression level corresponding to the open position, the endodontic file can be disengaged from the hook, and the security mechanism blocks the detachment mechanism, and when the push button is further pressed to the second depression level beyond the open position, the security mechanism unblocks the detachment mechanism, wherein when the push button is at the first depression level, the endodontic file can be disengaged from the hook, and the security mechanism blocks manual movement of the hook into the detachment slot, and when the push button is further pressed to the second depression level the security mechanism unblocks manual movement of the hook, and the hook can be freely moved into the detachment slot.

3. The endodontic file clip according to claim 2, characterized by further comprising: another security mechanism which is constituted by the push button that has the two depression levels, and that is provided without a collar, when the push button is pressed to the first depression level then it becomes flush with a lower part of the body, and when the push button is further pressed to the second depression level then the push button is deep inside the body.

4. The endodontic file clip according to claim 1, characterized in that the detachment slot comprises a window portion; the hook comprises a key portion wider than the detachment slot and matching the window portion; and the push button has two depression levels, when the push button is at the first depression level the endodontic file can be disengaged from the hook, and the key portion stays short of clearance from detachment slot at the tip, and when the push button is further pressed to the second depression level then the hook can be freely tilted through the detachment slot, wherein the window portion and the key portion constitute a security mechanism.

5. The endodontic file clip according to claim 4, characterized in that the interior of the hollow body is provided with a ramp for guiding the key portion through the window portion during reassembly.

6. The endodontic file clip according to claim 1, characterized in that a front face of the push button comprises a slot for a screwdriver or a protruding grip to facilitate rotation of the push button during attachment or detachment.

7. The endodontic file clip according to claim 1, characterized in that the push button has either a cam groove or a cam pin; and the body has a cam pin or a cam groove for respectively matching each other as the push button is pressed, rotated by a predetermined angle and released for alignment with the detachment slot.

8. The endodontic file clip according to claim 7, characterized in that the push button has two depression levels, when the push button is at the first depression level then the endodontic file can be disengaged from the hook, and the cam pin stays short of clearance from a vertical portion of the cam groove, and when the push button is further pressed to the second depression level then the hook can be freely rotated in a horizontal portion of the cam groove to get aligned with the detachment slot, wherein cam groove and the cam pin constitute a security mechanism.

9. An endodontic file clip for an apex locator, comprising:
a hollow body;
a push button movably linked to the body;
a spring pushing the push button away from the body;
an electrically conductive hook movably arranged within the body and partly protruding out of a hole on a tip of the body and fixed to the push button to securely attach an endodontic file to the tip when the push button is released towards a closed position, and disengage from the endodontic file when the push button is pressed towards an open position;
characterized by further comprising:
a detachment mechanism for re-attachably detaching the push button, the spring and the hook from the body, wherein the detachment mechanism comprises a detachment slot in the body which extends up to the tip and joins said hole, to allow manual detachment of the push button, the spring and the hook from the body when the hook is manually moved from said hole into the detachment slot, and further wherein the hook is tiltable for alignment with the detachment slot:

a security mechanism, wherein the push button has two depression levels, and when the push button is at the first depression level corresponding to the open position, the endodontic file can be disengaged from the hook, and the security mechanism blocks the detachment mechanism, and when the push button is further pressed to the second depression level beyond the open position, the security mechanism unblocks the detachment mechanism, wherein when the push button is at the first depression level, the endodontic file can be disengaged from the hook, and the security mechanism blocks manual movement of the hook into the detachment slot, and when the push button is further pressed to the second depression level the security mechanism unblocks manual movement of the hook, and the hook can be freely moved into the detachment slot.

10. The endodontic file clip according to claim 9, characterized in that the detachment slot is at a back portion of the body, averted from a u-shaped portion of the hook; and the hook is manually tiltable for alignment with the detachment slot.

11. The endodontic file clip according to claim 10, characterized in that the detachment slot comprises a window portion; the hook comprises a key portion wider than the detachment slot and matching the window portion; and when the push button is at the first depression level, the key portion stays short of clearance from detachment slot at the tip, and when the push button is further pressed to the second depression level then the hook can be freely tilted through the detachment slot, wherein the window portion and the key portion constitute the security mechanism.

12. The endodontic file clip according to claim 11, characterized in that the interior of the hollow body is provided with a ramp for guiding the key portion through the window portion during reassembly.

13. The endodontic file clip according to claim 9, characterized in that the detachment slot is at a lateral portion of the body; and the hook is manually rotatable for alignment with the detachment slot.

14. The endodontic file clip according to claim 13, characterized in that a front face of the push button comprises a slot for a screwdriver or a protruding grip to facilitate rotation of the push button during attachment or detachment.

15. The endodontic file clip according to claim 13, characterized in that the push button has either a cam groove or a cam pin; and the body has a cam pin or a cam groove for respectively matching each other as the push button is pressed, rotated by a predetermined angle and released for alignment with the detachment slot.

16. The endodontic file clip according to claim 15, characterized in that when the push button is at the first depression level, the cam pin stays short of clearance from a vertical portion of the cam groove, and when the push button is further pressed to the second depression level then the hook can be freely rotated in a horizontal portion of the cam groove to get aligned with the detachment slot, wherein cam groove and the cam pin constitute the security mechanism.

17. The endodontic file clip according to claim 9, characterized by further comprising: another security mechanism which is constituted by the push button that has the two depression levels, and that is provided without a collar, when the push button is pressed to the first depression level then it becomes flush with the lower part of the body, and when the push button is further pressed to the second depression level then the push button is deep inside the body.

* * * * *

UNITED STATES PATENT AND TRADEMARK OFFICE
CERTIFICATE OF CORRECTION

| | | |
|---|---|---|
| PATENT NO. | : 12,390,316 B2 | Page 1 of 1 |
| APPLICATION NO. | : 17/610231 | |
| DATED | : August 19, 2025 | |
| INVENTOR(S) | : Martin Pfleiderer | |

It is certified that error appears in the above-identified patent and that said Letters Patent is hereby corrected as shown below:

On the Title Page

On page 2, in Column 2, under item (56) "Other Publications", Line 3, delete "Authorityl;" and insert --Authority;-- therefor

Signed and Sealed this
Eighteenth Day of November, 2025

John A. Squires
*Director of the United States Patent and Trademark Office*